United States Patent
Johnson, Jr. et al.

[11] Patent Number: 6,126,827
[45] Date of Patent: Oct. 3, 2000

[54] HIGH-STRENGTH SEPTAGE BIOLOGICAL TREATMENT SYSTEM

[75] Inventors: Charles L. Johnson, Jr., 17 High St., Guilford, Conn. 06437; Howard J. Brown, Guilford, Conn.; William F. Brinton, Jr., Chestnut Ridge, N.Y.

[73] Assignee: Charles L. Johnson, Jr., Guilford, Conn.

[21] Appl. No.: 08/159,739

[22] Filed: Nov. 30, 1993

[51] Int. Cl.⁷ ........................................................ C02F 3/32
[52] U.S. Cl. ........................ 210/602; 210/605; 210/609; 210/170; 210/241; 210/259
[58] Field of Search ...................... 210/602, 605, 210/609, 613, 620, 630, 747, 170, 195.1, 257.1, 259, 260, 241

[56] References Cited

U.S. PATENT DOCUMENTS

| | | | |
|---|---|---|---|
| 3,770,623 | 11/1973 | Seidel | 210/602 |
| 4,209,388 | 6/1980 | DeFraites | 210/602 |
| 4,333,837 | 6/1982 | Plosz et al. | 210/747 |
| 4,655,925 | 4/1987 | Tabata et al. | 210/605 |
| 4,678,582 | 7/1987 | Lavigne | 210/170 |
| 4,839,051 | 6/1989 | Higa | 210/170 |
| 4,999,103 | 3/1991 | Bogart | 210/241 |
| 5,078,882 | 1/1992 | Northrup | 210/602 |
| 5,137,625 | 8/1992 | Wolverton | 210/602 |
| 5,174,897 | 12/1992 | Wengrzynek | 219/602 |

Primary Examiner—Christopher Upton
Attorney, Agent, or Firm—Bachman & LaPointe, P.C.

[57] ABSTRACT

A wastewater treatment system is disclosed which can be used to treat high-strength septage, sewage and industrial wastewater. The wastewater treatment system consists of three major components. In the first component, solids are separated from the liquid component of the wastewater being treated. The separated solid portion is removed to a composting component wherein it is turned into a commercially useful compost material. The liquid component is subjected to a two part treatment wherein the first part of the treatment is carried out in a sequencing batch reactor and the second part is carried out in at least one reed bed. In an alternative embodiment of the present invention, the various components of the wastewater treatment system are in modular form.

21 Claims, 6 Drawing Sheets

HIGH-STRENGTH SEPTAGE BIOLOGICAL TREATMENT SYSTEM

BACKGROUND OF THE INVENTION

The present invention relates to a system and a process for treating and purifying high strength wastewater for recycling or discharge to groundwater sources.

In many parts of the country, the available supply of fresh groundwater has been drastically lowered due to extended periods of drought. In some areas, groundwater has become polluted by solid waste materials, toxic chemicals, industrial waste and the like. The demand for clean groundwater has caused municipalities to investigate ways to treat and purify wastewater.

A number of different wastewater treatment and water purification methods and systems are known in the art. For example, U.S. Pat. No. 4,415,450 to Wolverton illustrates a method for treating wastewater which comprises the steps of subjecting the wastewater to an anaerobic settling step for at least six hours and passing the liquid effluent from the anaerobic settling step through a filter cell in an upflow manner wherein the effluent is subjected first to the action of an anaerobic and facultative microorganism and then to the action of aerobic microorganisms and the roots of at least one vascular aquatic plant. The system employed by Wolverton comprises a preliminary vessel in which is carried anaerobic settling and a hybrid filter for the effluent from the preliminary vessel. The hybrid filter has a lower portion inoculated on the surface with anaerobic and facultative microorganisms and an upper portion inoculated on the surface with aerobic microorganisms and which is growing vascular aquatic plants.

U.S. Pat. No. 4,793,929 to Kickuth exemplifies another method for purifying sewage waters. In this method, the sewage water is caused to react with atmospheric oxygen to oxidize ammonia in the sewage water to nitrate in a first purification stage. In a second subsequent purification stage, which contains areas rich in atmospheric oxygen and areas poor in atmospheric oxygen, the nitrate formed in the first purification stage is converted to nitrogen.

U.S. Pat. No. 4,333,837 to Plosz et al. illustrates a process for purifying water that is polluted with diffuse substances such as fertilizers, mineral and soil particles, oils, wastes, detergents and primarily inorganic substances which might accelerate undesirable entrophication of the receiving waters. The process comprises the steps of introducing the polluted water into a defined area such as a basin; spreading the water crosswise to increase its surface area; and extracting the diffuse pollutants by applying a biological treatment by the expedient of at least one group of suitable aquatic plants. The apparatus for performing the process comprises means that provide a flow path for the water; at least one dividing structure that performs the spreading; and at least one aquatic plant region, with at least one plant zone, wherein the plants contribute to the biological treatment.

U.S. Pat. No. 5,078,882 to Northrop relates to a bioconversion reactor and system that has utility in the treatment of wastewater. When used to treat wastewater, the wastewater influent passes through a preliminary screen where grit and other large particulate matter are removed for direct cycling to a solids ecoreactor. Thereafter, the preliminary cleaned influent enters the bioreactor. The bioreactor comprises a structurally contained and physically controlled microbial growth zone. Its principal function is to attach soluble materials to living aggregates of biomass and to begin the bioconversion process through the association of the undesirable material with microbial physiological processes. The bioreactor may contain multiple different subenvironments including aerobic, anoxic, and/or anaerobic zones, mixing, quiescent, settling and solids separation zones and one or more recycles. The effluent from the bioreactor, and any solids which may be wasted separately from the effluent, are cycled into the solids ecoreactor which is preferably located directly on top of the georeactor. The solids ecoreactor contains maximally diversified populations of plants, animals, and microorganisms, all living in an extensive variety of different subenvironments.

U.S. Pat. No. 5,137,625 to Wolverton illustrates still another water purification system. The system shown in this patent comprises a multi-stage active biological wastewater treatment apparatus. The apparatus contains an anaerobic, sludge settling first lagoon. A controlled flow aspirator system then injects air into the odoriferous effluent from the anaerobic chamber as part of the natural water flow out of the chamber into the first of a series of biological treatment chambers. The first treatment chambers use duckweed. A harvesting apparatus is provided to retain the growing biomass of duckweed that occurs as a result of the treatment process. Within the aerobic duckweed treatment chambers, a rotating effluent outflow pipe retains an effective biomass of duckweed for the treatment process and removes a chosen quantity of the growing biomass for harvesting. A final treatment stage uses high density grasses to form a filter mat and produce the high surface area needed for enhance bacterial action. The final treated effluent is then partially diverted and recirculated, being sprayed to form an upper layer of substantially pure, fecal coliform free, oxygenated water, covering the anaerobic waste water within the initial anaerobic chamber, eliminating the release of odors.

Published European patent application 0 390 265 to Bonaventura illustrates a process for purifying wastewater that comprises oxidation of the wastewaters with oxygen in the presence of a catalyst; phytopurification by causing the wastewaters to flow through one or more cells inside which plants are contained; and filtration of the wastewater in the presence of zeolite.

While these processes are capable of purifying wastewaters, they do not address all of the needs of municipalities to process certain types of wastewaters. They also fail to address the needs of small municipalities who have relatively small scale applications.

SUMMARY OF THE INVENTION

It is therefore an object of the present invention to provide a system and a process for treating wastewater, particularly high-strength wastewaters such as septage or sewage.

It is a further object of the present invention to provide a system and a process as above which can be installed and operated at low cost and in an environmentally sound manner.

The foregoing objects of the present invention are attained by the wastewater treatment system and process of the present invention.

The wastewater treatment system of the present invention may be used to treat high-strength wastewater such as septage, sewage, septic tank effluent, dairy wastes, high-strength livestock animal waste and industrial wastewater. As used herein the term "high-strength wastewater" means wastewater with BOD and nitrogen levels greater or equal to that of domestic sewage. Typically domestic sewage has an average BOD of 30–35 mg/l, total suspended solids of 10 mg/l and total nitrogen of 20 mg/l.

In accordance with the present invention, the wastewater treatment system consists of three major components. In the first component, solids are separated from the liquid component of the wastewater being treated. The separated solid portion is removed to a composting component wherein it is turned into a commercially useful compost material. The liquid component is subjected to a two part treatment wherein the first part of the treatment is carried out in a sequencing batch reactor and the second part is carried out in at least one reed bed. One of the principal advantages to the system of the present invention is that it readily lends itself to a modular construction. As a result, key components may be preconstructed and readily assembled at a desired site at a relatively low cost to the installing entity.

During the processing of the liquid component of the wastewater, solid biomass from the sequencing batch reactor and solids from the reed bed(s) are removed and incorporated into the composting process. Additionally, liquid from the composting process such as storm runoff and leachate is introduced into the reactor to dilute the influent and thereby make the reactor process more effective.

Other details of the wastewater treatment system and the process of the present invention are set out in the following detailed description and the accompanying drawings wherein like reference numerals depict like elements. Additionally, other objects of and advantages to the system and the process of the present invention are described in the following detailed description.

DETAILED DESCRIPTION

Figure 1:
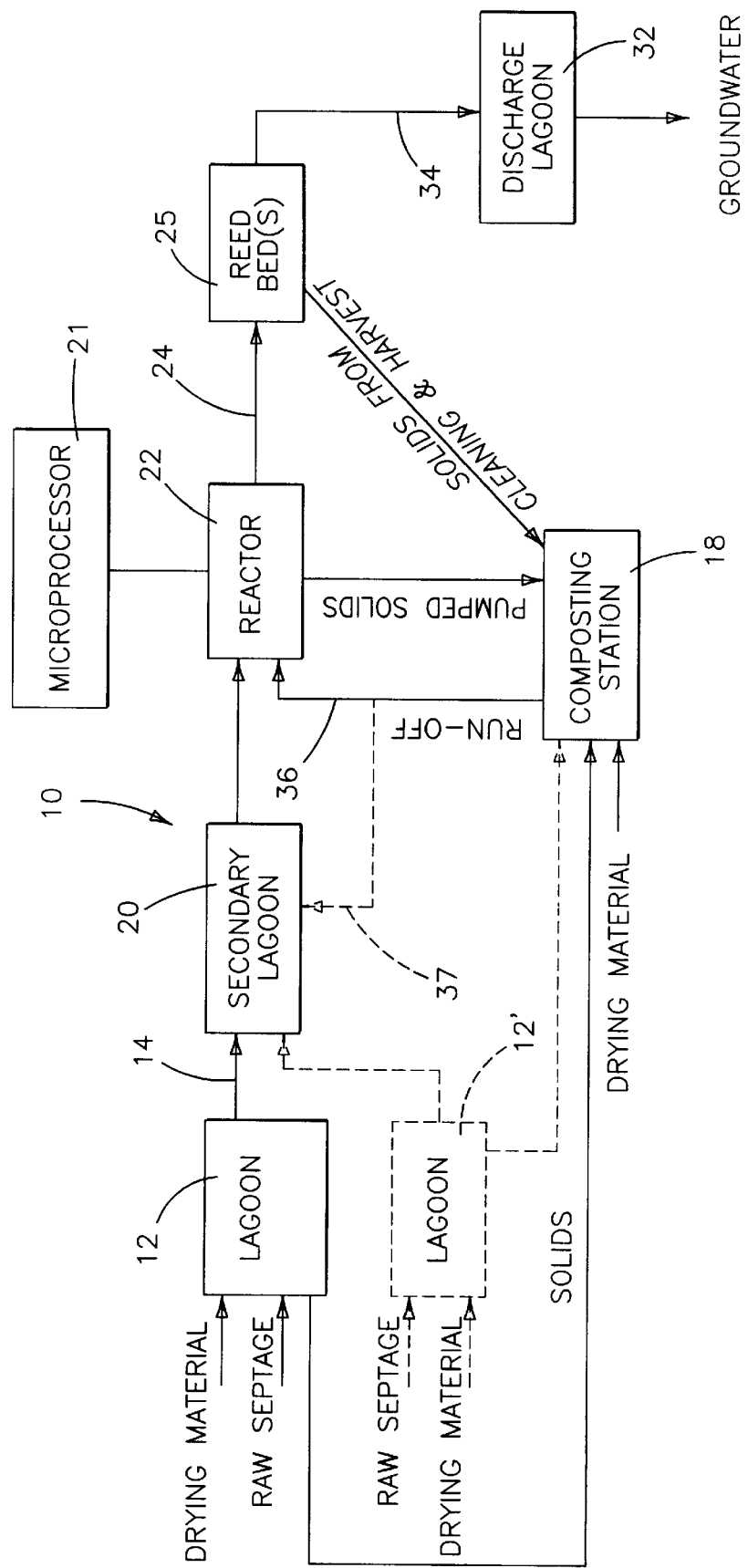
FIG. 1 is a schematic representation of the system of the present invention.

Referring now to the drawings, FIG. 1 is a schematic representation of the wastewater treatment system 10 of the present invention. As shown therein, wastewater such as high-strength raw septage, sewage or industrial wastewater to be treated is introduced into a settling tank or lagoon 12. The wastewater may be piped into the lagoon 12 if it is coming through a municipal sewage system or the like. Alternatively, if the source of the wastewater is individual septic systems, it may be brought by truck and removed from the truck through a suitable pumping system (not shown).

Figure 2:
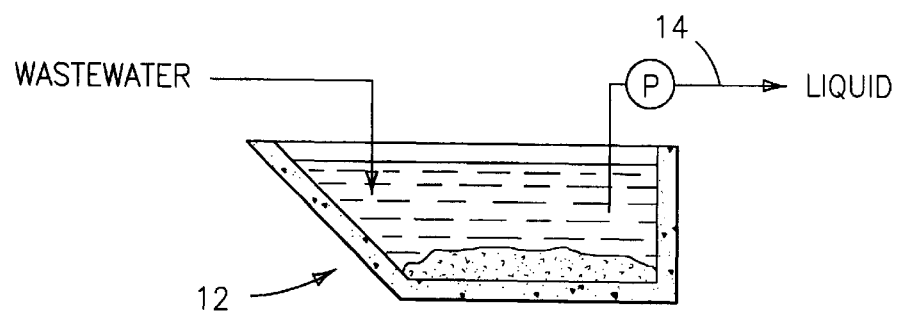
FIG. 2 is a sectional view of one type of settling tank which can be used in the system of the present invention.

In a preferred embodiment of the system 10, there are in fact two settling lagoons 12 and 12'. Each settling lagoon may comprise any suitable settling tank arrangement known in the art. For example, the settling lagoon may consist of a lined walled structure such as that shown in FIG. 2 having inlet means for receiving the wastewater and outlet pipe means 14 for removing liquid from the lagoon. It is preferred to have two lagoons so that they can be used alternately. This allows the settled solids to be removed from the inactive settling lagoon while the active lagoon is being used. Typically, the raw wastewater will reside in a lagoon for about seven days to allow the solid materials to settle. When a lagoon is inactive, the liquid is decanted from above the solids via pipe means 14. After the liquid has been decanted, a drying/absorbing/bulking material such as wood chips are dropped into the lagoon at a ratio of wood chips to solids of about 2.5:1 in order to absorb any remaining solid/liquid mixture. The lagoon 12 is preferably provided with a ramp or other access means (not shown) to allow a front end loader (not shown) or other means to add the wood chips into the tank, to mix the solids and wood chip mixture, and to remove the solids/wood chip mixture from the lagoon.

The solids and wood chips removed from the lagoon(s) 12 and 12' are taken to a composting station 18 for composting. At the composting station, composting of the solids preferably takes place on an asphalt pad (not shown) where the mixture is piled onto perforated pipe (not shown) or into windrows (not shown). If desired, additional drying/absorbing/bulking material can be added at the start of the composting process. Thereafter, composting takes place in one of two ways. The first is the "aerated static pile" method where blowers (not shown) are attached to the piping system to force aeration. Alternatively, windrows may be used, and turned frequently to allow for aeration. The solid material is actively composted for a minimum of 21 days and cured for an additional 30 days before it is in a fully processed and usable form. During the composting operation, it is necessary that temperatures remain over 55° C. for at least three consecutive days in order to allow for the destruction of pathogens. Maintenance of these temperatures even under the coldest outdoor temperatures is routine since the decomposition process generates its own heat. Supplementary fossil fuel sources are not required.

Liquid removed from the lagoon(s) 12 via the pipe means 14 flows first to a secondary lagoon 20 and then to a sequencing batch reactor 22. The secondary lagoon 20 enables a uniform (steady state) flow of decanted wastewater to be pumped to the sequencing batch reactor 22 for treatment. The secondary lagoon also tends to dampen large fluctuations in the decanted wastewater quality. The secondary lagoon 20 may be a concrete or walled lagoon having a desired depth and suitable inlet and outlet pipes connected to it.

The sequencing batch reactor 22 operates on a batch basis with all phases of the process taking place in sequence in the same tank instead of the wastewater moving through a series of tanks for completion of the treatment process phases as is the case in the usual activated sludge treatment process. As a result, the system of the present invention has fewer components than other systems, is less expensive to construct and operate, and can act on high-strength wastewaters.

In the reactor 22, an activated sludge process is used to purify the decanted wastewater. The activated sludge process utilizes a biological mass of bacteria and microorganisms (hereinafter referred to as "bio-mass") suspended in water (which suspension is referred to as "mixed liquor") to remove most of the organic pollutants and nitrogenous compounds present in the wastewater. The bacteria may be of the type ordinarily found in wastewater treatment. No specialized bacteria is required. The bacteria in the bio-mass makes use of the organic and inorganic carbon in the wastewater as a food source. Initially, a seed mix of bacteria from another wastewater treatment facility will be present in the reactor 22.

Some of the bacteria present in the biomass are capable of removing organic pollutants and converting organic nitrogen to ammonia nitrogen under both aerobic (molecular oxygen present and dissolved in the mixed liquor) and anaerobic (molecular oxygen lacking) conditions. Those bacteria that can exist under both aerobic and anaerobic conditions are known as facultative bacteria. Other bacteria (nitrifiers) present in the biomass convert ammonia-nitrogen to nitrates under aerobic conditions only. These bacteria obtain their carbon from the carbon dioxide present in the wastewater. Still other types of bacteria (denitrifiers) are capable under anoxic conditions (oxygen available only in nitrates) of breaking down or reducing the nitrates to obtain the oxygen needed for their metabolic processes. The reduction of nitrates results in the release of nitrogen that had been chemically bound in the nitrates as nitrogen gas to the atmosphere. Such release has no adverse effect on the environment as nitrogen is already a significant constituent of the atmosphere.

During the denitrification phase, the denitrifiers must have a source of carbon available for a food supply. Most biological processes used for nitrogen removal either make use of the organic carbon in the raw wastewater as a source of food for the denitrifiers or utilize a source of organic carbon such as methanol that is fed into the reactor. Where the organic carbon in the wastewater is used as a food supply, special sequences of aerobic and anoxic operations are used.

Figure 3:
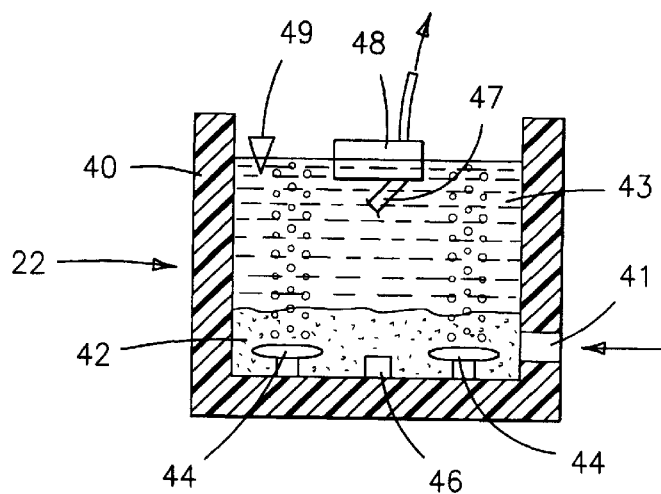
FIG. 3 is a sectional view of the sequencing batch reactor used in the system of the present invention.

FIG. 3 illustrates the sequencing batch reactor 22. As shown therein, an amount of biomass 42 is present at the bottom of a tank 40. Aeration diffusers 44, connected to a source of compressed air (not shown), are provided to permit aeration of the material being treated. A sludge pump 46 is provided to permit removal of sludge from the bottom of tank 40. A floating decanting mechanism 48 is provided to allow clarified liquid to be decanted from the reactor 22. A hose (not shown) having an inlet at a desired depth below the surface is attached to the decanting mechanism. This prevents floating scum from entering the decant line. The decanting mechanism 48 is preferably provided with means for preventing mixed liquor from entering the mechanism during treatment phases. A mixing device 49 is provided to generate the required mixing. The tank also has an inlet 41 at the bottom to introduce the wastewater into the tank.

The processing performed by the reactor 22 involves five basic phases which include FILL, REACT, SETTLE, DECANT and WASTE. A sixth phase IDLE may be used when the flow to the treatment plant is considerably below the design flow. Control of the process is via a microprocessor (programmable logic controller) 21. The microprocessor 21 may comprise any suitable computer known in the art containing a suitable program for operating the reactor 22. The FILL phase can be divided into sub-phases such as STATIC FILL (no mixing), MIXED FILL and REACT FILL, to accomplish certain levels of treatment such as below 10 mg/liter of nitrates and the like.

The STATIC FILL sub-phase begins with an amount of biomass 42 in the reactor tank 40. Typically, the bio-mass will exist as a layer of suspended solids at the bottom of the tank, having accumulated there generally during previous SETTLE and DECANT phases. A layer 43 of clarified liquid exists above the solids layer, and the water quality in the upper portion of this liquid layer is essentially the same as the quality of the reactor effluent which has just been decanted. The layer of bio-mass provides the means to initiate the biodegradation of the pollutants contained in the incoming batch of wastewater.

During STATIC FILL, wastewater is introduced at the bottom of the tank 40 via inlet 41 without mixing. This sub-phase is used as a means to condition the existing bio-mass by reducing the number of filamentous micro-organisms that may be present in the mixed liquor. Excessive amounts of such filamentous micro-organisms can hinder settling of the biomass during the SETTLE phase and can result in excessive suspended solids being discharged in the effluent during the DECANT phase. In the STATIC FILL sub-phase, the food supply (pollutants present in the wastewater) is high, the dissolved oxygen content is very low. This favors the growth of a mass of facultative bacteria. The facultative bacteria multiply more rapidly than filamentous organisms (most of which are believed to be obligate aerobes that thrive in conditions where dissolved oxygen is present in concentrations too low to support other types of aerobic bacteria) and in doing so take in and store most of the available food supply, thus in effect "starving" the filamentous organisms.

Thus, the STATIC FILL sub-phase acts as a means of "selecting" the type of micro-organisms desired.

During the MIXED FILL sub-phase, the influent wastewater is rigorously mixed with the existing contents of the tank without adding oxygen. The mixing device 49 which may comprise a propeller type mixer or a water jet mixer is used to effect the desired mixing. Thorough mixing of the influent wastewater with the mixed liquor allows removal of organic and facilitates conversion of organic nitrogen to ammonia nitrogen. This takes place under these conditions through the action of the facultative bacteria in the bio-mass. Denitrification of nitrates may be present in the mixed liquor can also occur during this phase.

In the REACT FILL sub-phase, wastewater is fed into the reactor 22 while the reactor's contents is continuously mixed. Oxygen is dissolved into the mixture via the air diffusers 44 which may be of the bubble type. This supports the oxidation processes of the aerobic and facultative fraction of the bio-mass in the conversion of the organic pollutants to carbon dioxide, water and new microbial cell mass. The dissolved oxygen also assists the nitrification processes of the nitrified fraction of the bio-mass in conversion of the ammonia-nitrogen to nitrates.

The REACT phase (aerobic phase) consists of continuing to mix and aerate the mixed liquor in the reactor 22 without feeding wastewater to the reactor. Further removal of organic and nitrification take place in this phase until oxidation of the organic pollutants and nitrification of the ammonia-nitrogen present is essentially complete.

The SETTLE phase consists of stopping the mixing and aeration of the mixed liquor and allowing the bio-mass to settle to the bottom of the tank 40. One of the major advantages to the use of the reactor 22 is the creation of essentially perfect quiescent conditions during the SETTLE phase. During this phase, there is no inflow of waste, no mixing and no aeration taking place. This permits rapid settlement of the suspended bio-mass without any disturbance.

During the DECANT phase, the fully treated and clarified wastewater is skimmed by the decanting mechanism 48 from an upper portion of the clarified liquid in the reactor without disturbing the settled bio-mass at the bottom of the tank.

During the WASTE phase, some of the bio-mass is removed from the reactor 22 by using sludge pump 46 to pump some of the settled solids in the bottom of the tank to sludge holding tanks and/or to the compost station. This is done to remove excess bio-mass that has grown during the various phases FILL, MIX and REACT phases so as to maintain the correct amount of the biomass in the tank 40. The WASTE phase can take place near the end of the DECANT phase or during the IDLE phase when the biomass layer at the bottom of the tank has reached its highest concentration.

The IDLE phase is not needed as an operational phase but is rather than period between completion of the DECANT Phase and the beginning of the next FILL phase. The IDLE phase only occurs when actual flows are substantially less than the design flows. During an extended IDLE phase, it may become necessary to periodically aerate the mixed liquor to prevent it from becoming anaerobic.

The various FILL, MIX and REACT phases, the SETTLE Phase and the WASTE phase are controlled on a time basis and the time spent in each phase can be readily adjusted to suit required operating conditions by reprogramming the microprocessor 21. Typically, an entire cycle will last several hours and 3–4 cycles can be performed per day. The actual time of the DECANT phase is usually controlled by the liquid level in the reactor tank 40 following completion of the various FILL, MIX and REACT phases. The liquid level in the reactor can also be readily changed to suit required operating conditions.

One of the factors which must be taken under consideration in the process performed in the reactor 22 is the food to microorganism (F/M) ratio. This is the ratio of the weight of the organic pollutants available in the wastewater to the weight of the bio-mass suspended in the mixed liquor. When nitrification is required, the F/M ratio is normally 0.1 or less. Under such circumstances, the reactor process is termed "low loaded".

Other factors which are taken into account is the percent of the mixed liquor suspended solids that are volatile, the age of the sludge, amount of oxygen available, the organic oxidation rate, the nitrification rate, the denitrification rate, the temperature of the mixed liquor suspended solids, and the alkalinity of the mixed liquor.

When the amount of molecular oxygen dissolved in the mixed liquor and the amount of oxygen bound chemically in the nitrates is low, dissolved oxygen may be provided using diffusers 44 which may be any equipment known in the art capable of injecting air in the form of small bubbles into the mixed liquor in such a manner that the oxygen in the air bubbles is dissolved in and uniformly distributed throughout the mixed liquor.

The temperature of the mixed liquor is an important factor as the oxidation, nitrification, and denitrification rates are all affected by temperature since bacterial action decreases as temperature decreases. In particular, temperatures below 15° C. have a negative impact on the optimum nitrification rate while temperatures below 20° C. have a negative impact on the oxidation and denitrification rates. Both the nitrification and denitrification processes will continue at temperatures as low as 5° C. but the efficiency of these processes is generally quite low at these temperatures.

The pH of the mixed liquor is of particular importance in the nitrification and denitrification process and the pH must be maintained within a defined range in order to have efficient nitrification and denitrification. The optimum pH range for nitrification and denitrification is in the range of 7–8+.

The alkalinity in the mixed liquor is important as it helps to control the pH of the mixed liquor during the nitrification process. Alkalinity is depleted during the nitrification process, when acids are formed, and about half of that is recovered during the denitrification process. If sufficient alkalinity is not present in the influent wastewater to make up for the net amount lost in the nitrification-denitrification process, a supplemental source of alkalinity must be provided so that the residual alkalinity does not fall below 40–50 mg/l.

Figure 4:
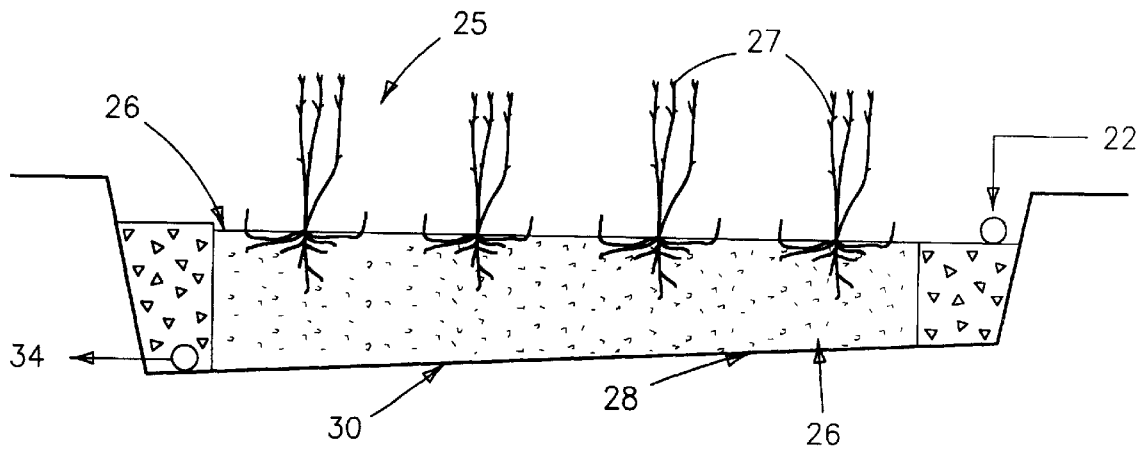
FIG. 4 is a sectional view of a reed bed used in the system of the present invention.

After the batch of liquid in the reactor has been treated, it is decanted by the decanting mechanism and sent to one or more reed beds 25 via pipe line 24. At this point, the wastewater is comparable in quality to secondary treated wastewater except that a substantial amount of total nitrogen has also been removed. The reed beds 25, as shown in FIG. 4 is a constructed wetland containing common reeds 27 such as Phragmites australis. The pretreated wastewater liquid flows through a bed 26 of either soil or gravel in which reeds 27 are growing. The reeds 27 provide a hydraulic pathway through which the liquid is able to flow. They also provide atmospheric oxygen to the rhizome layer soil by transporting it via the leaves and stems to the hollow rhizomes and out through the reed roots.

The horizontal reed bed shown in FIG. 4 has a soil or gravel bed 26 which is approximately two feet deep. The bed has a level surface and a bottom slope 28 of about 1% to allow filtrate to flow through the root zone of the reeds where it is treated by aerobic and facultative bacterias. The bed has an impervious liner 30 to prevent seepage of the partially treated wastewater to the groundwater.

Efficiency of treatment with the reed bed varies seasonally with temperature. Both the reed bed 25 and the reactor 22 are sized to allow for the reduced efficiencies during the winter months.

Effluent from the reed bed(s) 25 flows to a storage and discharge lagoon 32 via pipe line 34 for a final discharge to the groundwater. After the treatment performed by the process of the present invention, the concentration of nitrogen in the effluent is below required drinking water standards.

Reed vegetation can be harvested from the bed(s) 25 after each growing season. Any suitable means known in the art may be used to harvest the reed vegetation. The harvested vegetation may then be transported to the compost station 18.

Stormwater could pose a threat of run off which could produce leaching from the compost process. Additionally, the compost will also discharge some liquid run-off which should be further treated to eliminate any contamination of groundwater. This run-off is captured using any suitable stormwater collection system known in the art and is either transferred to the reactor 22 via pipe line 36 or to secondary lagoon 20 via pipe line 37 for further treatment. Not only does this insure complete treatment, the addition of partially treated water to the reactor 22 dilutes the inffluent coming from the lagoons making the reactor process more effective.

Figure 5:
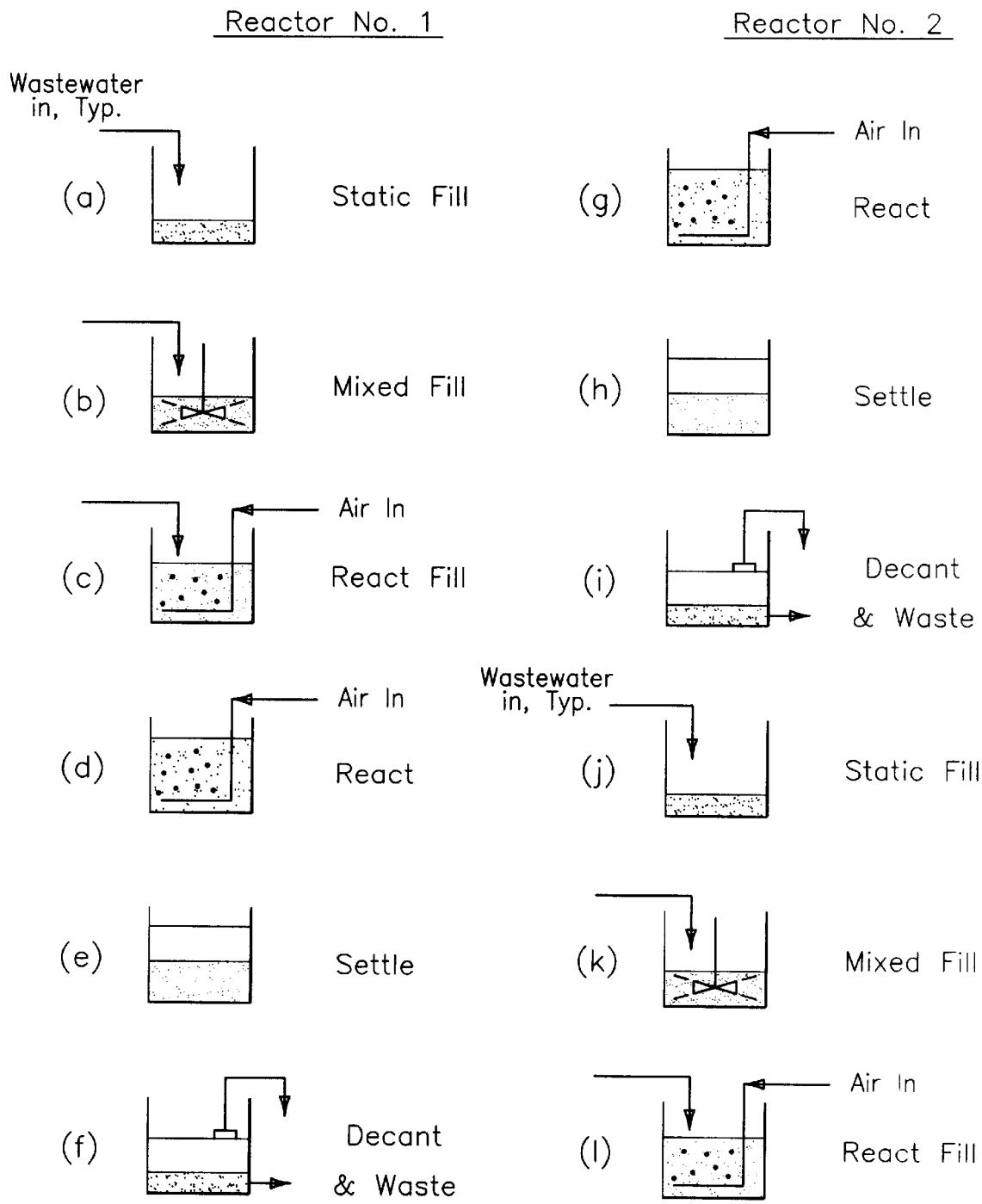
FIGS. 5(a)–5(l) are is a schematic representation of a process for a system having two reaction tanks.

FIGS. 5(*a*)–5(*l*) illustrate is a process schematic for a system having two reactor tanks 22 and 22'. This schematic assumes that there is no idle time; that is, there is sufficient influent flow to operate both reactors as shown. Where the influent flow rate varies, one or both of the reactors 22 and 22' may have some idle time. When a reactor is in the idle phase, some mixing or addition of air or both may be programmed to maintain the viability of the microorganisms that have settled to the bottom of the reactor.

When unusual peak flow occurs, such as from extraneous inflow during storm conditions, the programmable logic controller 21 can be set to reduce the cycle times so as to be able to accommodate the increased flow. Where a single tank system is used, a flow equalization basin may be required to store the influent flow during the react, settle, decant and waste phases of each cycle.

Figure 6:
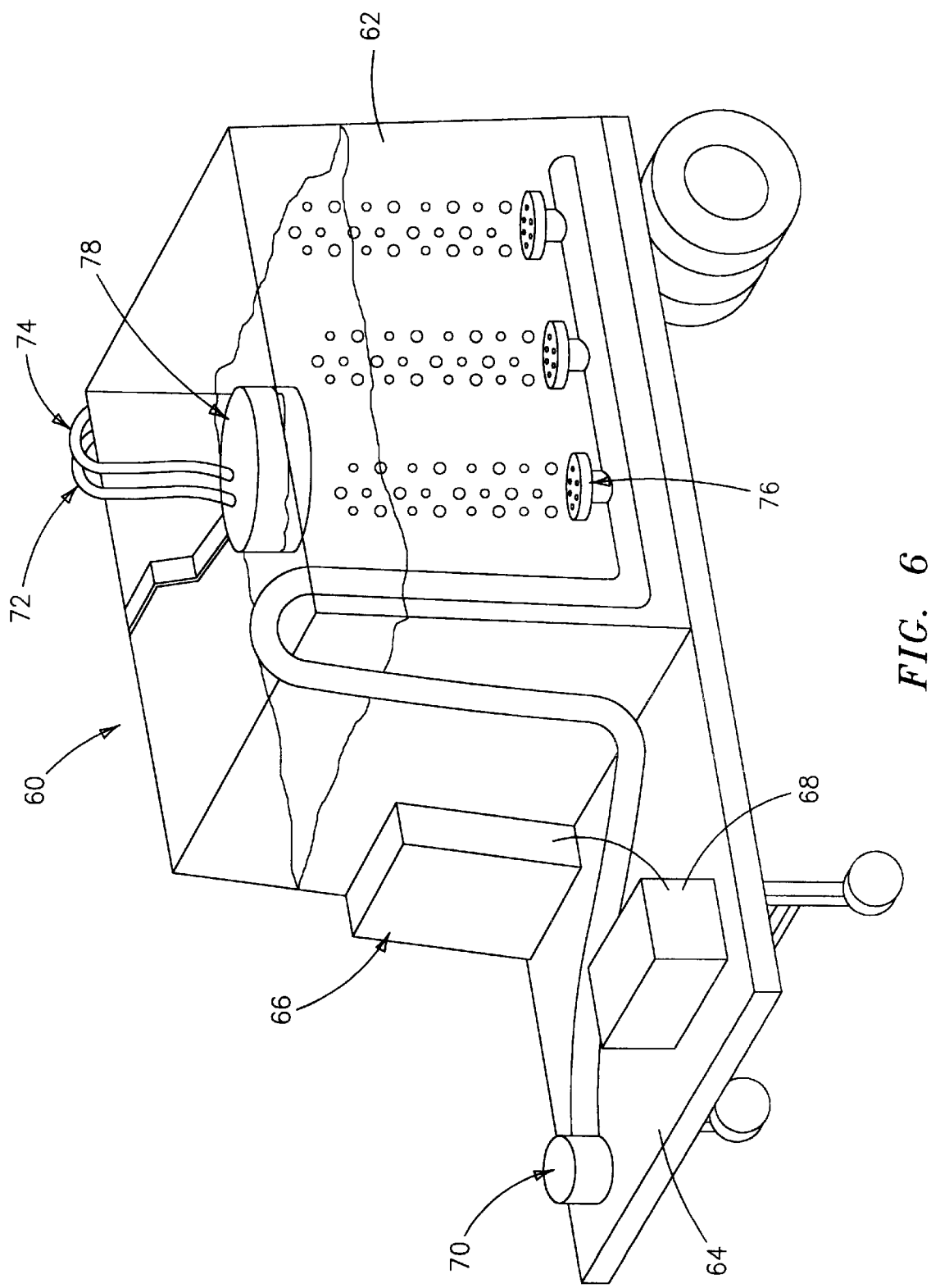
FIG. 6 is a schematic representation of a mobile reactor tank unit.

The system of the present invention is particularly advantageous because it various components can be prefabricated and transported to a desired site for assembly or merely for use. FIG. 6 illustrates a mobile reactor unit or modular reactor 60 for use in the system of the present invention. As shown therein, the reactor tank 62 may be placed on a transportable bed 64 such as a trailer bed or the like for transportation to a desired site. The mobile unit 60 includes a control panel 66 for controlling the process in the reactor tank 62, a generator 68 for providing power to the control panel and the various components of the tank, a blower 70 for aeration, intake and discharge hoses 72 and 74, aeration diffusers 76 for injecting air and a fill/decant mechanism 78.

Figure 7A:
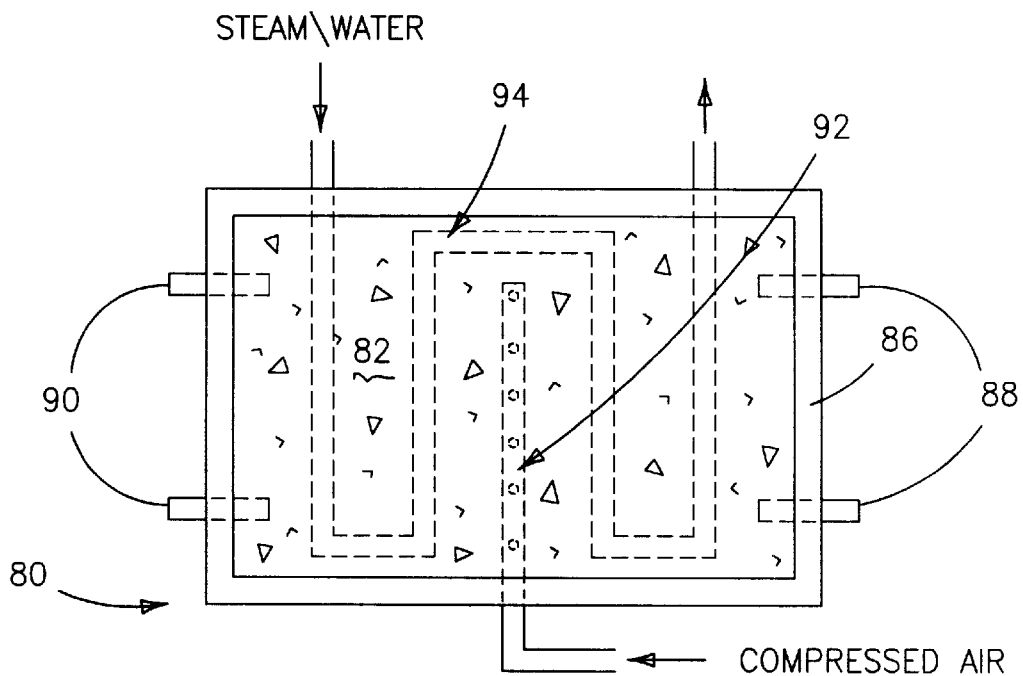
FIGS. 7A and 7B illustrate a portable reed bed unit.
Figure 7B:
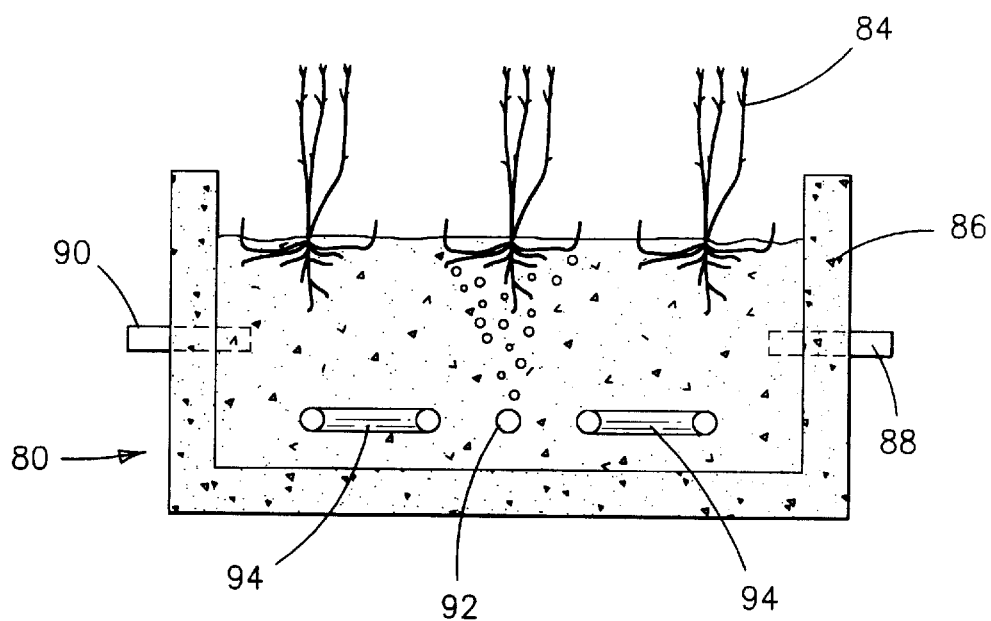

FIGS. 7A and 7B illustrate a modular reed bed unit 80 which can be employed in the system of the present invention. As before the reed bed includes a bed 82 of soil or washed gravel having a depth of 2–3 feet and a number of reed plants 84 embedded in the bed. The entire reed bed may be encased within a portable container 86 having inlet and outlet connections 88 and 90 for respectively connecting the portable reed bed to the effluent discharge pipe or hose 74 from the reactor 60 and to a storage and discharge lagoon. The container may be made from steel, concrete, aluminum, plastic, or any other suitable material. An optional aeration pipe 92 and optional heat pipes 94 may be provided if desired. The aeration pipe 92 may be connected to a source of compressed air (not shown). The heat pipes 94 may form a single heating unit connected to a supply of steam or heated water.

If desired, a number of modular reed beds can be connected in series or in parallel to act in effect as a single larger reed bed.

If desired, the settling lagoons to be used in the system may comprise lined tanks mounted on any suitable mobile transportation device. Each lagoon would of course have an inlet for receiving the raw wastewater and an outlet for discharging liquid from the tank. Additionally each lagoon would have suitable means for allowing periodical removal of solids.

By using such modular units, it is possible to assemble the system of the present invention in a matter of days as opposed to a matter of months. Additionally, as the needs of the system grow, more modules can be added to meet those needs. Still further, if any of the reed beds become contaminated, they can easily removed from the system and replaced by a new unit.

Figure 8:
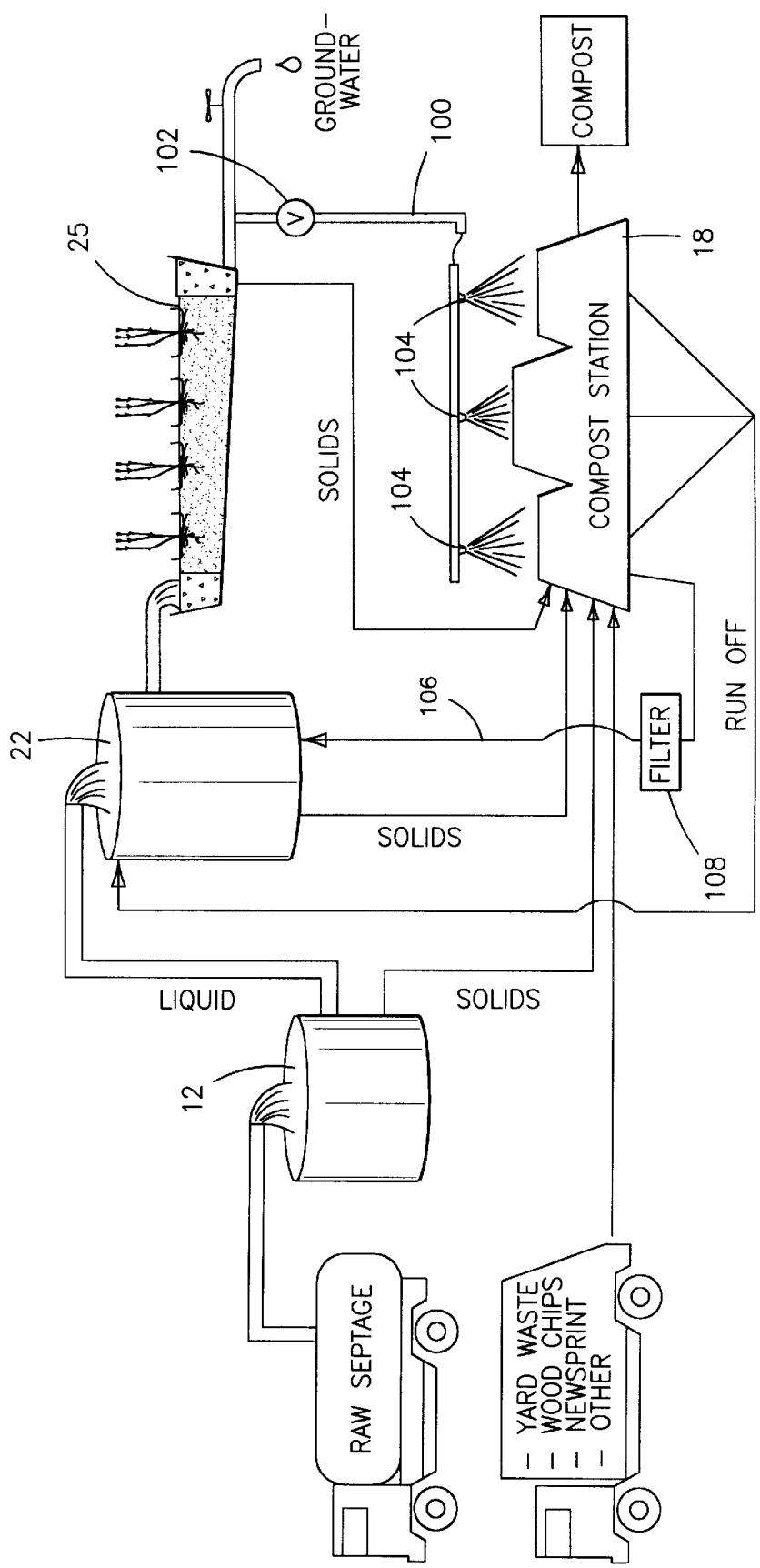
FIG. 8 illustrates an alternative embodiment of a wastewater treatment system in accordance with the present invention.

FIG. 8 illustrates an alternative embodiment of the wastewater treatment system of the present invention. The two key differences between the system of FIG. 1 and the system of FIG. 8 is the use of treated wastewater for compost irrigation and the feeding of gases generated during the composting process to the reactor 22. A pipe line 100 with a valve 102 is provided to allow treated wastewater to be used for compost irrigation. As shown in FIG. 8, the pipe line 100 includes a number of spray heads 104 to allow the water to be sprayed onto the compost material. If desired, substantially all of the treated wastewater can be sprayed onto the compost material to preclude substantially all of the treated wastewater from returning to the groundwater or surface water. A pipe line 106 is provided to permit gases generated during the composting process to be introduced into the reactor tank 40. The pipe line 106, if desired, may be connected to the diffusers 44 via suitable connections (not shown). An air filter 108 is preferably provided to remove unwanted odors and the like.

It is apparent that there has been provided in accordance with this invention a high-strength septage biological treatment system which fully satisfies the objects, means and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A system for treating high strength wastewater, said system comprising:

first means for receiving raw wastewater containing solids and liquid and for allowing said solids to settle and substantially separate from said liquid;

second means for treating a liquid influent from said receiving means so as to remove organic pollutants and nitrogenous compounds present in the influent and form a pretreated septage liquid; and third means for receiving said pretreated septage liquid and for treating said pretreated septage liquid with aerobic and facultative bacterias to form an effluent suitable for discharge to the groundwater;

means for composting said solids separated from said liquid in said first means and solids removed from said second and third means; and means for transporting said solids from said first, second and third means to said composting means.

2. The system of claim 1 further comprising:

means for transferring liquid run-off from said composting means to said second means.

3. The system of claim 1 wherein said first means comprises at least one settling lagoon for allowing said solids to separate from said liquid.

4. The system of claim 3 wherein said first means comprises at least two settling lagoons, said at least two settling lagoons being used alternately to allow for settled solids to be removed from an inactive one of said settling lagoons.

5. The system of claim 1 wherein said second means comprises a sequencing batch reactor means for treating said liquid influent from said first means with a biological mass of bacteria and micro-organisms suspended in water so as to remove said organic pollutants and said nitrogenous compounds, said sequencing batch reactor means consisting of a single tank in which said treatment takes place.

6. The system of claim 5 wherein said biological mass contains bacteria for removing said organic pollutants and for converting organic nitrogen to ammonia nitrogen under both aerobic and anaerobic conditions.

7. The system of claim 6 wherein said biological mass contains bacteria capable of converting said ammonia-nitrogen to nitrates under aerobic conditions.

8. The system of claim 7 wherein said biological mass contains bacteria for breaking down said nitrates under anoxic conditions to obtain oxygen necessary for metabolic processes performed in said sequencing batch reactor means.

9. The system of claim 1 wherein said third means comprises at least one reed bed.

10. The system of claim 9 wherein each said reed bed comprise a constructed wetland containing a number of reeds embedded in at least one of soil and gravel, said reeds providing a hydraulic pathway through which said pretreated septage liquid flows.

11. The system of claim 9 wherein each said reed bed has an impervious liner to prevent seepage of partially treated wastewater to the groundwater.

12. The system of claim 1 further comprising a storage and discharge lagoon for receiving said effluent and for finally discharging said effluent to the groundwater.

13. The system of claim 1 further comprising:

means for adding a drying/absorbing/bulking material to said solid/liquid mixture in said first means and to said solids in said composting means.

14. A process for treating wastewater which comprises the steps of:

introducing raw wastewater containing liquid and solids into a means for holding said raw septage;

allowing said solids to settle to a bottom portion of said holding means;

transferring liquid from said holding means to a reactor tank;

treating said transferred liquid in said reactor tank to remove organic pollutants and nitrogenous compounds and to form a pretreated septage liquid;

passing said pretreated septage liquid through at least one reed bed to form an effluent suitable for discharge to the groundwater; and transferring solid material from said holding means, said reactor tank and said at least one reed bed to a composting station.

15. The process of claim 14 further comprising:

transferring liquid run-off from said compost station to said reactor tank.

16. The process of claim 14 wherein said treating step comprises:

treating said liquid with a biological mass of bacteria and micro-organisms suspended in water to remove said organic pollutants and said nitrogenous compounds.

17. The process of claim 16 wherein said treating step further comprises converting organic nitrogen in said liquid to ammonia-nitrogen under both aerobic and anaerobic conditions, converting said ammonia nitrogen to nitrates under aerobic conditions, and breaking down said nitrates under anoxic conditions to obtain oxygen needed for metabolic processes being performed in said tank.

18. The process of claim 14 further comprising:

adding a drying/absorbing/bulking material to said solid/liquid mixture in said holding means and to said composting means.

19. A system for treating wastewater which comprises:

a settling lagoon for receiving raw wastewater containing solids and liquid and for allowing separation of said solids and said liquid so that said solids settle to the bottom of said settling lagoon;

a portable modular reactor unit for removing organic pollutants and nitrogenous compounds contained in said liquid and for forming a pretreated liquid, said portable reactor unit comprising a single treatment tank mounted on a transportable bed unit;

a portable modular reed bed for receiving said pretreated liquid and for converting said pretreated liquid to an effluent suitable for return to the groundwater; and means for composting solids removed from said settling lagoon, said portable reactor unit and said portable reed bed.

20. The system of claim 19 wherein said portable reed bed comprises a bed of at least one of gravel and soil located within a portable container and a plurality of plants embedded within said bed.

21. The system of claim 19 wherein said portable reactor unit includes a generator for supplying power, a blower for aerating liquid within the unit, and inlet and outlet means for receiving said liquid and for discharging said pretreated liquid.

* * * * *